United States Patent
Canel et al.

(10) Patent No.: US 9,043,306 B2
(45) Date of Patent: May 26, 2015

(54) CONTENT SIGNATURE NOTIFICATION

(75) Inventors: Fabrice Canel, Redmond, WA (US); Junaid Ahmed, Bellevue, WA (US); Thomas Francis McElroy, Seattle, WA (US); Walter Sun, Bellevue, WA (US); Kumar Chellapilla, Sammamish, WA (US); Abhishek Singh, Redmond, WA (US); Vishnu Challam, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 402 days.

(21) Appl. No.: 12/861,788

(22) Filed: Aug. 23, 2010

(65) Prior Publication Data

US 2012/0047121 A1 Feb. 23, 2012

(51) Int. Cl.
*G06F 17/30* (2006.01)

(52) U.S. Cl.
CPC .... *G06F 17/30864* (2013.01); *G06F 17/30336* (2013.01); *G06F 17/30109* (2013.01); *G06F 17/30867* (2013.01); *G06F 17/30899* (2013.01)

(58) Field of Classification Search
CPC .................. G06F 17/30109; G06F 17/30336
USPC ............. 707/709, 755, 696; 705/14.14
See application file for complete search history.

(56) References Cited

U.S. PATENT DOCUMENTS

| | | | |
|---|---|---|---|
| 6,424,966 B1 | 7/2002 | Meyerzon | |
| 6,631,369 B1 * | 10/2003 | Meyerzon et al. | 1/1 |
| 6,952,730 B1 | 10/2005 | Najork | |
| 7,082,454 B1 * | 7/2006 | Gheith | 709/203 |
| 7,428,530 B2 * | 9/2008 | Ramarathnam et al. | 1/1 |
| 7,653,617 B2 | 1/2010 | Strohm | |
| 7,725,452 B1 * | 5/2010 | Randall | 707/709 |
| 8,090,729 B2 * | 1/2012 | Gollapudi | 707/755 |
| 8,250,095 B2 * | 8/2012 | Wu et al. | 707/783 |
| 2001/0027450 A1 * | 10/2001 | Shinoda et al. | 707/1 |
| 2002/0023072 A1 * | 2/2002 | Stern et al. | 707/1 |

(Continued)

FOREIGN PATENT DOCUMENTS

JP 2006215735 A * 8/2006

OTHER PUBLICATIONS

Drugeon, Thomas, A technical approach for the French Web Legal Deposit—Published Date: 2005 http://iwaw.europarchive.org/05/papers/iwaw05-drugeon.pdf.

(Continued)

*Primary Examiner* — Scott A Waldron
(74) *Attorney, Agent, or Firm* — Dave Ream; Doug Barker; Micky Minhas (57) ABSTRACT

A client application installed on end user computers generates metadata from the content of web pages visited by end users and provides the metadata to a search engine. When an end user visits a web page, the end user's computer downloads and displays the web page to the end user. The client application may simultaneously access the web page content and generate this metadata in the form of a content signature of the web page from the web page content. The client application then provides the content signature to a search engine. The search engine may employ content signatures to identify new web pages to crawl and index. Additionally, the search engine may employ content signatures to identify changes to web pages and determine the crawl frequency of web pages.

20 Claims, 4 Drawing Sheets

(56) References Cited

U.S. PATENT DOCUMENTS

| | | | |
|---|---|---|---|
| 2002/0042923 A1* | 4/2002 | Asmussen et al. | 725/92 |
| 2004/0128285 A1 | 7/2004 | Green | |
| 2005/0071766 A1 | 3/2005 | Brill et al. | |
| 2007/0101146 A1* | 5/2007 | Louch et al. | 713/176 |
| 2007/0260643 A1* | 11/2007 | Borden et al. | 707/201 |
| 2009/0119268 A1* | 5/2009 | Bandaru et al. | 707/3 |
| 2009/0204575 A1 | 8/2009 | Olston | |
| 2009/0216641 A1* | 8/2009 | Hubbard | 705/14 |
| 2009/0287931 A1* | 11/2009 | Kinsella | 713/175 |
| 2010/0077098 A1 | 3/2010 | Fox | |

OTHER PUBLICATIONS

McDowell, Luke, et al., Evolving the Semantic Web with Mangrove—Published Date: Feb. 2003 http://citeseerx.ist.psu.edu/viewdoc/download?doi=10.1.1.12.5177&rep=rep1&type=pdf.

Bar-Yossef, Ziv, et al., Do Not Crawl in the DUST: Different URLs with Similar Text, 2007. http://www2007.org/papers/paper194.pdf.

Sherman, Erik, Cisco Files to Patent to Enter the Search Engine Business, Dec. 30, 2009. http://industry.bnet.com/technology/10004553/cisco-files-to-patent-to-enter-the-search-engine-business/.

\* cited by examiner

CONTENT SIGNATURE NOTIFICATION

BACKGROUND

Web search engines operate by storing information about web pages in a search engine index and employing the indexed information to return search results to user search queries. The web page indexing process includes employing web crawlers to retrieve web pages and index information about the crawled web pages. Determining which web pages to crawl and how often to crawl the web pages is a complex problem that can have a significant impact on a search engine. If a search engine crawls web pages too frequently, the search engine places a significant load on the content servers serving the web pages in terms of bandwidth and CPU resources. As a result, webmasters may not welcome the search engine's crawlers, especially if competitor search engines are crawling the web sites more intelligently resulting in fewer crawls. Inefficient crawling also increases the operating costs of the search engine. On the other hand, if a search engine does not crawl web pages frequently enough, the search engine will be slow to capture changes to web pages. As a result, the search engine's search results will suffer in relevance and freshness. If the search engine also does not effectively discover new web pages, the relevance and freshness of the search engine's search results will be further degraded, which in turn will result in a poorer search experience for end users.

For each web page, the crawl frequency (determining when the content will be crawled or re-crawled) is often determined primarily by importance computed for the web page. As the crawl frequency of a web page is based on its importance, important web pages are scheduled to be crawled often (e.g., daily), while less important web pages are scheduled to be crawled less often (e.g., monthly). In some cases, additional information gathered by the crawler may be taken into account to learn if the content is changing often and employed to determine crawl frequency.

Managing a relevant search engine index requires not only crawling new relevant web pages to index new content, but also re-crawling existing web pages to take into account content changes, such as, for instance, in-page content changes, or link changes (the most drastic of these changes being new pages and old, empty or deleted pages). As such, the crawler is really performing two tasks at once: (1) detecting page changes—new/updated content and links, or not; and (2) gathering new/updated content/links.

Unfortunately, the current architecture of typical search engines provides a catch-22. To figure out if a web page has any changes which need to be captured, the search engine has to first crawl the web page to look for changes. This means that for pages that are very important, even if they don't change frequently, the search engine needs to constantly re-crawl them. Unfortunately, in that situation, the search engine has wasted the crawl bandwidth on both the search engine servers and the websites' servers.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a client application installed on end user computers that generates metadata from the content of web pages visited by end users and provides the metadata to a search engine. When an end user accesses a web page, the web page is downloaded and displayed to the end user. The client application operates by accessing the content of the web page and generating a content signature of the web page from the web page content. The client application then provides the content signature of the web page to a search engine. The search engine may employ content signatures provided by client applications on end user computers in a number of manners. For instance, the search engine may employ content signatures to discover web pages being visiting by end users but not currently indexed by the search engine. The search engine may employ such information to determine to index the newly discovered web pages. Additionally, the search engine may analyze the content signatures to identify changes to the content of web pages. This information may help the search engine in calculating the optimum crawl frequency of web pages based on this analysis.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide a client application that is installed on end users' computers and operates to provide metadata of web pages visited by end users to a search engine. The metadata allows, among other things, the search engine to identify new web pages and changes to web page content.

When an end user visits a web page, the end user's computer downloads the web page and presents the web page to the user. The client application operates in the background by accessing the content of the web page to create a content signature of the web page. As used herein, the term "content signature" refers to a representation of a web page generated from the content of the page. For instance, the content signature may be a hash value generated by the client application applying a hash function to the web page content. The client application provides the generated content signature to a search engine.

In practice, the client application is preferably installed on a number of end user computers. Whenever the end users visit web pages, the client applications generate content signatures and provide the content signatures to a search engine along with the associated URLs. As such, the search engine may benefit by receiving information regarding web pages visited by a large number of end users and determine if the content has updated based on, for instance, the last received content signature.

The search engine may employ the content signatures for a variety of purposes. For instance, the search engine may employ the content signatures to discover web pages being visited by end users that are not currently indexed. The search engine may then determine to crawl and index the newly discovered web pages. Additionally, the search engine may analyze the content signatures to identify changes to the content of web pages and employ that information in determining the crawl frequency for different web pages. In some instances, the content signatures may simply allow the search engine to determine that the content of web pages has changed. In other instances, the content signatures may allow the search engine to determine the extent of change to the web page content and/or the location of the changed web page content. Such additional information may further facilitate providing intelligent crawling of web pages by the search engine.

In essence, the client application allows the search engine to offload the task of crawling web pages to discover content changes to users who are downloading the web pages anyways. As such, the webmasters don't see any additional load while the search engine may conserve crawling resources by crawling web pages more intelligently based on the content signature information provided by the client applications. Additionally, the resources of web servers are not consumed by inefficient crawling.

Accordingly, in one aspect, an embodiment of the present invention is directed to one or more computer storage media storing a client application comprising computer-useable instructions that, when used by an end user's computing device, cause the end user's computing device to perform a method. The method includes accessing content of a web page downloaded to the end user's computing device. The method also includes generating a content signature from the content of the web page. The method further includes communicating the content signature from the end user's computing device to a search engine server.

In another embodiment, an aspect of the invention is directed to one or more computer storage media storing computer-useable instructions that, when used by a computing device, cause the computing device to perform a method. The method includes receiving, at a search engine server from an end user's computing device, a content signature of a web page, the content signature comprising a representation of the web page generated from the content of the web page by a client application on the end user's computing device. The method also includes storing the content signature of the web page.

A further embodiment of the invention is directed to one or more computer storage media storing computer-useable instructions that, when used by a computing device, cause the computing device to perform a method. The method includes receiving, at a search engine server, content signatures of a plurality of web pages, the content signatures having been generated at a plurality of end user computing devices from content of web pages downloaded and displayed by the end user computing devices. The method also includes analyzing the content signatures to identify content changes on web pages. The method further includes controlling crawling of web pages based on analysis of the content signatures.

Figure 1:
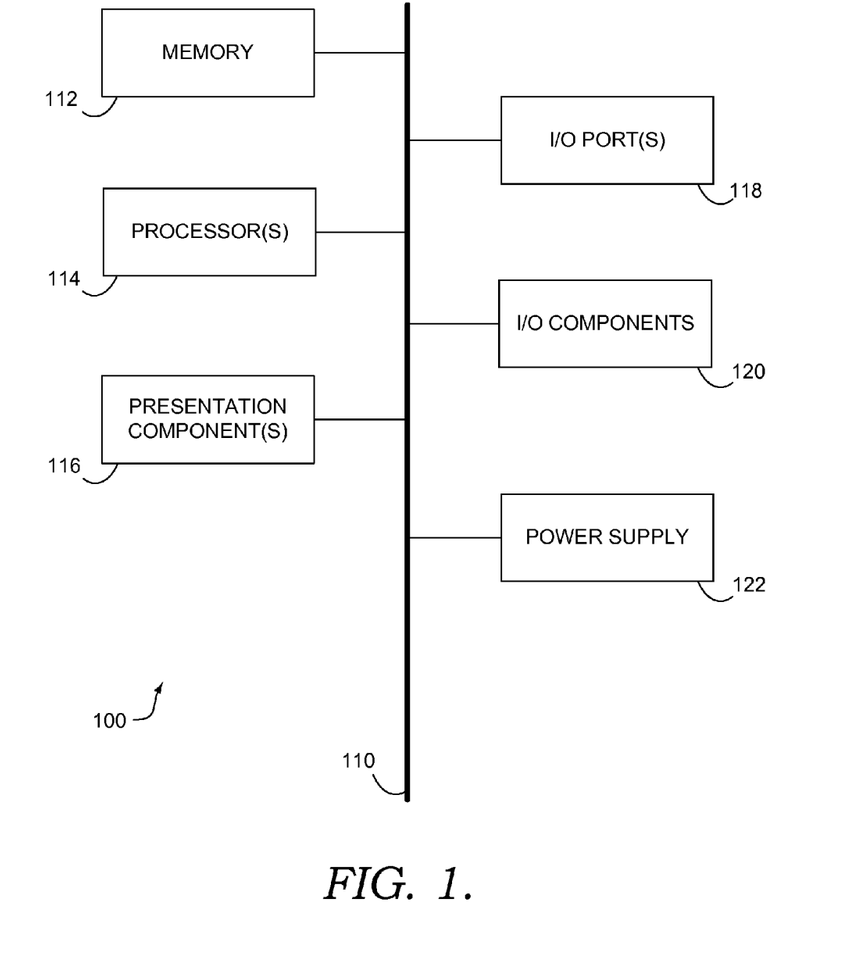
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
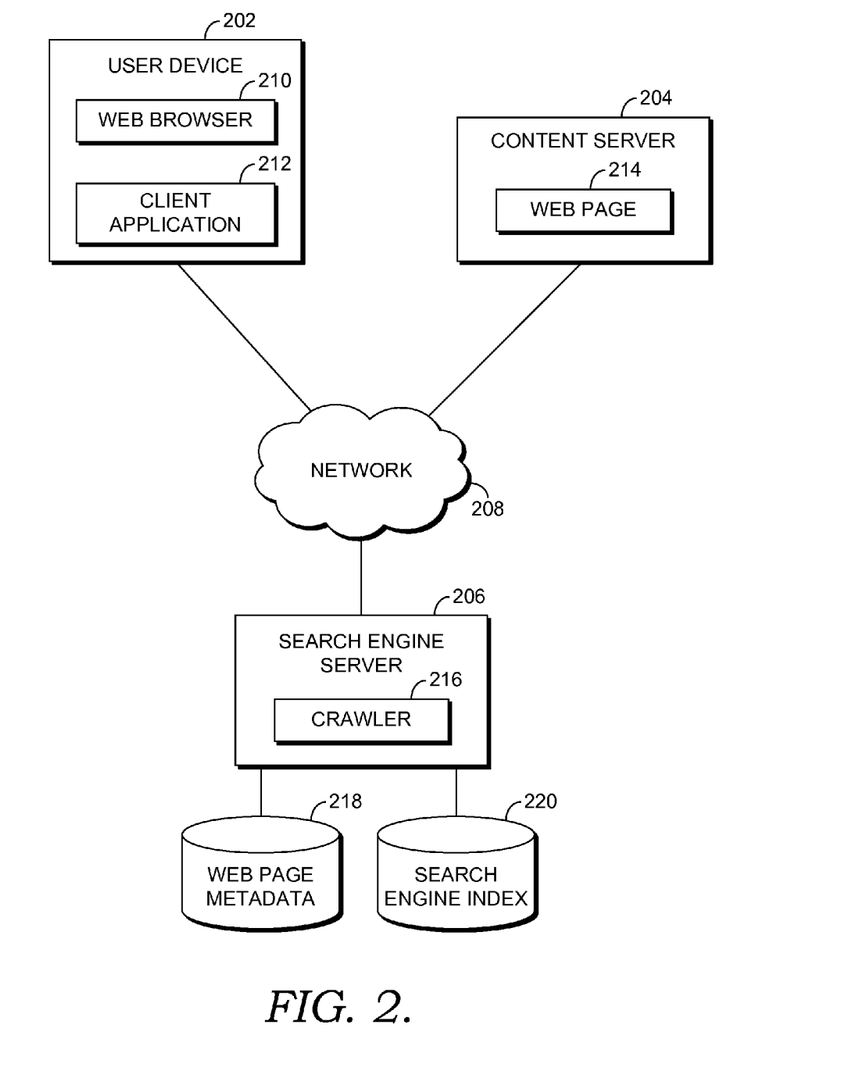
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a content server 204, and a search engine server 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 200 within the scope of the present invention. Each may comprise a single device or multiple devices cooperating in a distributed environment. For instance, the search server 206 may comprise multiple devices arranged in a distributed environment that collectively provide the functionality of the search engine server 206 described herein. Additionally, other components not shown may also be included within the system 200, while components shown in FIG. 2 may be omitted in some embodiments.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents maintained by content servers, such as the content server 204. For instance, the end user may employ a web browser 210 on the user device 202 to access and view electronic documents from the content server 204. Although a web browser is shown in FIG. 2, other applications installed on the user device 202 may be employed to download and display content from content servers.

The content server 204 may be any type of server device capable of hosting electronic documents and serving the electronic documents to computing devices such as the user device 202. For instance, the content server 204 may be a web server maintaining web pages, such as web page 214.

The search engine server 206 may be any type of server device capable of providing search services to user devices, such as the user device 202. Among other things, the search engine server 206 includes a crawler 216 that is employed to crawl web pages maintained by content servers, such as the web page 214 on content server 204, and index data from the web pages in a search engine index 220. When users submit search queries to the search engine 206, the search engine 206 searches the search engine index 220 to provide search results in response to the search queries.

In accordance with embodiments of the present invention, the user device 202 includes a client application 212 that operates to generate content signatures from the content of web pages accessed by the user device 202 and provide the content signatures to the search engine server 206. The client application 212 may be a component of the web browser 210, a browser extension (e.g., a search toolbar), or other application installed on the user device 202. In some embodiments, a search system provider who provides the search services via the search engine server 206 provides the client application to the end user for installation on the user device 202.

When a user employs the web browser 210 (or other component) to access a web page from a content server, such as web page 214 on content server 204, the web browser 210 downloads the web page and presents the content of the web page via a graphical user interface provided by the web browser 210. The client application 212 accesses content from the web page and generates a content signature from the content. As such, the content signature is a representation of the web page generated from the content of the web page. The content of the web page accessed by the client application and used by the client application 212 to generate the content signature may be any portion of the content that may be displayed to the end user via the web browser 210. For instance, the content of the web page may include text, images, sounds, videos, etc. In some embodiments, the content signature may be generated based on the text only. In other embodiments, other portions of the presentable content of the web page may be employed to generate the content signature. In further embodiments, multiple content signatures may be generated for a web page using different portions of the content (e.g., one content signature for text, another for images, etc.).

A variety of different algorithms may be employed to generate the content signature of a web page. In some embodiments, the content signature is a hash value that is generated by applying a hash function to the web page. Any of a variety of different hash functions may be employed by the client application 212 to generate content signatures within the scope of embodiments of the present invention.

After the client application 212 generates a content signature of a web page from the web page content, the client application 212 provides the content signature to the search engine server 206. In some embodiments, the client application 212 may provide the content signature for a web page accessed by the user device 210 upon downloading the web page and generating the content signature. In other embodiments, the client application 212 may batch content signatures generated from various web pages accessed by the user device 212 and periodically provide the batched content signatures to the search engine server 206.

The client application 212 may provide additional metadata when providing a content signature for a web page to the search engine server 206. In some embodiments, the client application 212 provides an indication of the URL of the web page and a timestamp indicating, for instance, a time that the web page was accessed and/or the content signature was created. Other metadata may also be provided to the search engine service 206, such as, for instance, a location of the end user.

Although only a single user device is shown in FIG. 2, in practice, multiple user devices may include a client application to generate content signatures for web pages accessed by those user devices and provide the content signatures to the search engine server 206. Additionally, although only a single content server is shown in FIG. 2, in practice, the client applications on user devices may access web pages from any number of content servers. As such, the search engine server 206 may receive content signatures for any web page visited by end users having the client application installed on their computers. In embodiments, the client applications installed on the various user devices employ a similar algorithm to generate content signatures such that the search engine server 206 may effectively compare content signatures provided by client applications on different user devices.

Content signatures provided to the search engine server 206 by client applications on user devices, such as the client application 212 on user device 202, may be stored in web page metadata storage 218. Other metadata provided by the client application 212 may also be stored in the web page metadata storage 218.

The search engine server 206 may employ the content signatures provided by user devices and stored in the web page metadata storage 218 for a variety of purposes. For instance, in some embodiments, the search engine server 206 may analyze the content signatures to discover web page being visited by end users but not currently indexed in the search engine index 220. Based on the discovery of such web pages, the search engine 206 may determine to crawl and index the web pages.

In some embodiments of the present invention, the search engine server 206 may employ the content signatures to determine changes in web page content and control crawling of web pages for indexing purposes. Initially, the search engine server 206 may analyze the content signatures of web pages to identify changes in the content of web pages. In some instances, the algorithm employed by client applications on user devices may only support identifying whether the content of a web page content has changed. For instance, the search engine server 206 may access two or more content signatures for a given web page (e.g., corresponding with a particular URL) and compare the content signatures. If the content signatures are the same, the web page content has not changed. However, if the content signatures have changed, the web page content has changed. This information may be employed by the search engine server 206 to control crawling of web pages.

In one embodiment, each web page is classified into a category based on its change history evidenced by its content signatures and crawled based on its category. For instance, the crawler may include the following rules:
  Do not crawl web pages that have not changed.
  Crawl web pages that have changed.
  Crawl web pages that are frequently change with some buffer between each crawl that is determined based on the importance of the web pages.
  Use default crawl frequency logic for web pages for which content signature information is unavailable or stale.

In some embodiments, the algorithm employed by client applications may generate content signatures that allow for a determination of the extent to which a web page has changed and/or the location of changes with the web page. For instance, a hash function may be employed in which the difference in hash values generated from the content of a web page is statistically related to the extent of change in the web page. For example, if 15 percent of the web page content has changed, probabilistically 15 percent of bits in the hash values will be different. If the content signatures provide such additional information, the search engine server 206 may employ the additional information to even more intelligently determine the crawl frequency of web pages. For instance, significant content changes may warrant crawling a web page while insignificant content changes may not.

Figure 3:
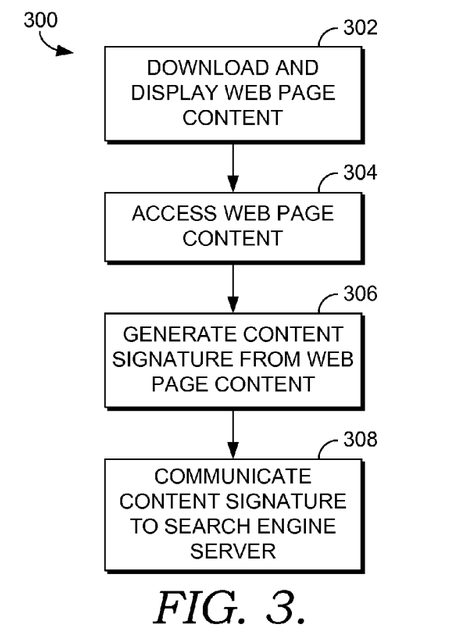
FIG. 3 is a flow diagram showing a method for generating a content signature for a web page on an end user's computing device in accordance with an embodiment of the present invention.

Turning now to FIG. 3, a flow diagram is provided that illustrates a method 300 for generating a content signature from web page content on a user device and providing the content signature to a search engine server in accordance with an embodiment of the present invention. Initially, as a shown at block 302, a web page is downloaded at a user device and web page content is displayed on the user device. The web page may be downloaded and displayed via a web browser or other application installed on the user device. For instance, the user may be browsing the web and download the web page for viewing.

A client application accesses content of the web page, as shown at block 304. As indicated previously, the client application may be a component of a web browser on the user device, a browser extension, or other application installed on the user device. After accessing the web page content, the client application generates a content signature from the web page content, as shown at block 306. In some embodiments, the content signature is a hash value generated by the client application by applying a hash function to the web page content.

As shown at block 308, the client application communicates the content signature to a search engine server. In some embodiments, the client application may communicate other metadata in addition to the content signature. For instance, in one embodiment, the client application provides an indication of the web page's URL with the content signature. As another example, the client application may provide a timestamp representing a time that the web page was downloaded or the content signature was created, for instance. Other types of metadata, such as the location of the end user, may also be provided to the search engine server in embodiments of the present invention.

Figure 4:
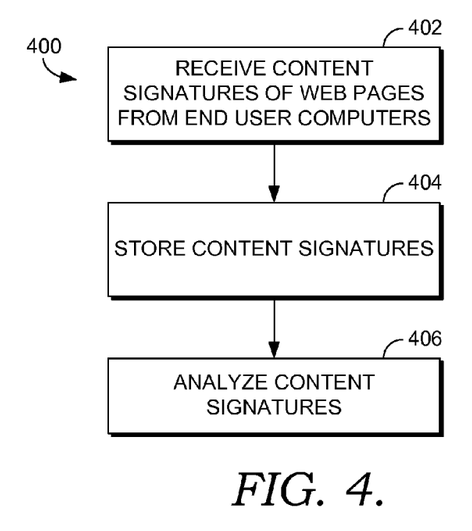
FIG. 4 is a flow diagram showing a method for receiving content signatures from end user computing devices at a search engine server in accordance with an embodiment of the present invention.

Referring next to FIG. 4, a flow diagram is provided that illustrates a method 400 for receiving content signatures from end user computers at a search engine server in accordance with an embodiment of the present invention. Initially, as shown at block 402, content signatures are received at the search engine server. The content signatures may have been generated by client applications on end user computers, such as described above with reference to FIG. 3.

The search engine server may store received content signatures, as shown at block 404. As such, the search engine server may collect content signatures for various web pages from a number of different end user computers. The search engine server may employ the content signatures for a number of purposes. As such, the search engine server analyzes the content signatures, as shown at block 406.

Figure 5:
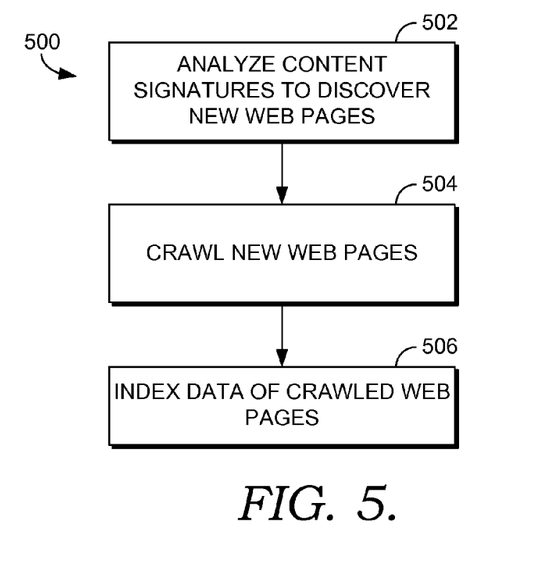
FIG. 5 is a flow diagram showing a method for analyzing content signatures to discover new web pages to crawl and index in accordance with an embodiment of the present invention.

In one embodiment, the search engine server may examine the content signatures to identify web pages visited by end users but not currently indexed in the search engine index. As shown in the method 500 of FIG. 5, the search engine server analyzes the content signatures to discover new web pages at block 502. The search engine server then determines to crawl newly discovered web pages, as shown at block 504, and indexes data for the crawled web pages, as shown at block 506. In some embodiments, the search engine server may not simply crawl and index all newly discovered web pages. Instead, the search engine server may determine whether to crawl and index web pages based on factors such as the number of users accessing the newly discovered web pages and the frequency with which the web pages are being accessed.

Figure 6:
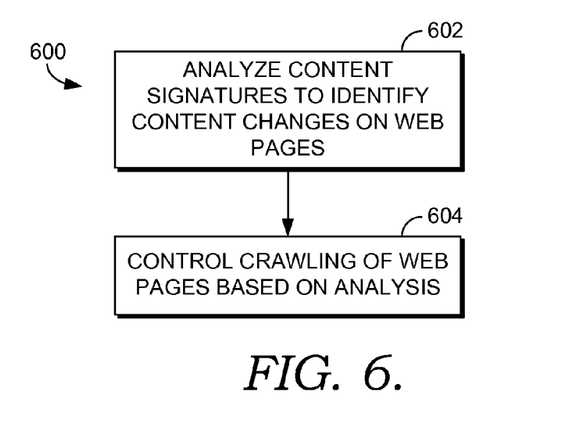
FIG. 6 is a flow diagram showing a method for analyzing content signatures to identify content changes on web pages and control crawling of web pages in accordance with an embodiment of the present invention.

In another embodiment depicted by the method 600 shown in FIG. 6, the search engine server may employ content signatures to control the crawling frequency of web pages. As shown at block 602, the search engine server analyzes content signatures to identify changes to content on web pages. The search engine server controls crawling of web pages based on the analysis, as shown at block 604.

As can be understood, embodiments of the present invention provide for generating content signatures on end user computers and providing the content signatures to a search engine server, which may analyze the content signatures to, for instance, discover new web pages and control the crawling frequency of web pages.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A search engine server comprising:
one or more processors; and
one or more computer storage media storing computing-useable instructions that, when used by the one or more processors, cause the one or more processors to:
receive, at the search engine server from an end user computing device, a plurality of content signatures of a web page, the plurality of content signatures having been automatically generated at the end user computing device from content of the web page downloaded and displayed by the end user computing device, the web page having been downloaded by the end user computing device from one or more content servers separate from the search engine server when an end user employed the end user computing device to access the web page during a web browsing session, each content signature corresponding with a different portion of the content of the web page, each portion comprising one of text, images, video, and audio;
analyze, at the search engine server, the plurality of content signatures to identify a portion of the content that has changed on the web page by determining a difference between at least one of the plurality of content signatures and a content signature accessible by the search engine server; and
control crawling of the web page by the search engine server based on the portion of the content that has changed on the web page
receive, at the search engine server from an end user's computing device, a content signature of a web page, the content signature comprising a representation of the web page automatically generated from the content of the web page by a client application on the end user's computing device, the web page having been downloaded by the end user's computing device from a content server separate from the search engine server when an end user employed the end user's computing device to access the web page during a web browsing session;
compare, at the search engine server, the content signature of the web page received from the end user's computing device to a second content signature of the web page accessible to the search engine server;
determine, at the search engine server, a location of content within the web page that has changed based on a difference determined between the content signature of the web page received from the end user's computing device and the second content signature of the web page accessible to the search engine server; and
crawl the web page based on determining the location of content within the web page that has changed.

2. The search engine server of claim 1, wherein the instructions further cause the one or more processors to: receive additional metadata from the end user user's computing device, the additional metadata comprising an indication of a uniform resource locator for the web page and a timestamp.

3. The search engine server of claim 1, wherein analyzing comparing the plurality of content signatures signature of the web page received from the end user's computing device with the second content signature of the web page includes determining an extent to which the content of the web page has changed.

4. The search engine server of claim 3, wherein the instructions further cause the one or more processors to: control crawling of the web page by the search engine server based on determining the extent to which the content of the web page has changed.

5. The search engine server of claim 1, wherein a first content signature from the plurality of content signatures comprises a hash value generated by the end user computing device applying a hash function to a first portion of the web page.

6. The search engine server of claim 1, wherein analyzing the plurality of content signatures comprises determining a location of the portion of the content that has changed on the web page, and wherein the instructions further cause the one or more processors to control crawling of the web page by the search engine server based on determining the location of the portion of the content that has changed on the web page.

7. One or more computer storage hardware devices storing computer-useable instructions that, when used by a computing device, cause the computing device to perform a method, the method comprising:
   receiving, at a search engine server from an end user computing device, a plurality of content signatures of a web page, the plurality of content signatures having been automatically generated at the end user computing device from content of the web page downloaded and displayed by the end user computing device, the web page having been downloaded by the end user's user computing device from one or more content servers separate from the search engine server when an end user employed the end user computing device to access the web page during a web browsing session, each content signature corresponding with a different portion of the content of the web page, each portion comprising one of text, images, video, and audio;
   analyzing, at the search engine server, the plurality of content signatures to identify a portion of the content that has changed on the web page by determining a difference between at least one of the plurality of content signatures and a content signature accessible by the search engine server; and
   controlling crawling of the web page by the search engine server based on the portion of the content that has changed on the web page.

8. The one or more computer storage hardware devices of claim 7, wherein the method further comprises receiving additional metadata associated with the plurality of content signatures from the end user computing device devices.

9. The one or more computer storage hardware devices of claim 8, wherein the additional metadata associated with each of the plurality of content signatures signature comprises an indication of a uniform resource locator for the web page and a timestamp.

10. The one or more computer storage hardware devices of claim 7, wherein analyzing the plurality of content signatures comprises determining an extent to which the content of the web page has pages have changed.

11. The one or more computer storage hardware devices of claim 10, wherein the method further comprises controlling crawling of the web page by the search engine server based on determining the extent to which the content of the web page has changed.

12. The one or more computer storage hardware devices of claim 7, wherein a first content signature from the plurality of content signatures comprises a hash value generated by the end user computing device applying a hash function to a first portion of the web page.

13. The one or more computer storage hardware devices of claim 7, wherein analyzing the plurality of content signatures comprises determining a location of the portion of the content that has changed on the web page, and wherein the method further comprises controlling crawling of the web page by the search engine server based on determining the location of the portion of the content that has changed on the web page.

14. A method performed by a search engine service, the method comprising:
   receiving, at a search engine server from an end user computing device, a plurality of content signatures signature of a web page, the plurality of content signatures signature having been automatically generated at the end user computing device from content of the web page downloaded and displayed by the end user computing device, the web page having been downloaded by the end user user's computing device from one or more content servers separate from the search engine server when an end user employed the end user computing device to access the web page during a web browsing session, each content signature corresponding with a different portion of the content of the web page, each portion comprising one of text, images, video, and audio;
   analyzing, at the search engine server, the plurality of content signatures signature to identify a portion of the content that has changed on the change in the content of the web page by determining a difference between at least one of the plurality of content signatures and a content signature accessible by the search engine server the content signature and a second content signature of the web page accessible by the search engine server; and
   controlling crawling of the web page by the search engine server based on the portion of the content that has changed on the web page identifying the change in the content of the web page.

15. The method of claim 14, wherein the method further comprises receiving additional metadata associated with the plurality of content signatures from the end user computing device devices.

16. The method of claim 15, wherein the additional metadata associated with each of the plurality of content signatures signature comprises an indication of a uniform resource locator for the web page and a timestamp.

17. The method of claim 14, wherein analyzing the plurality of content signatures comprises determining an extent to which the content of the web page has pages have changed.

18. The method of claim 17, wherein the method further comprises controlling crawling of the web page by the search engine server based on determining the extent to which the content of the web page has changed.

19. The method of claim 14, wherein a first content signature from the plurality of content signatures comprises a hash value generated by the end user computing device applying a hash function to a first portion of the web page.

20. The method of claim 14, wherein analyzing the plurality of content signatures comprises determining a location of the portion of the content that has changed on the web page, and wherein the method further comprises controlling crawling of the web page by the search engine server based on determining the location of the portion of the content that has changed on the web page.

* * * * *